Figure 1:
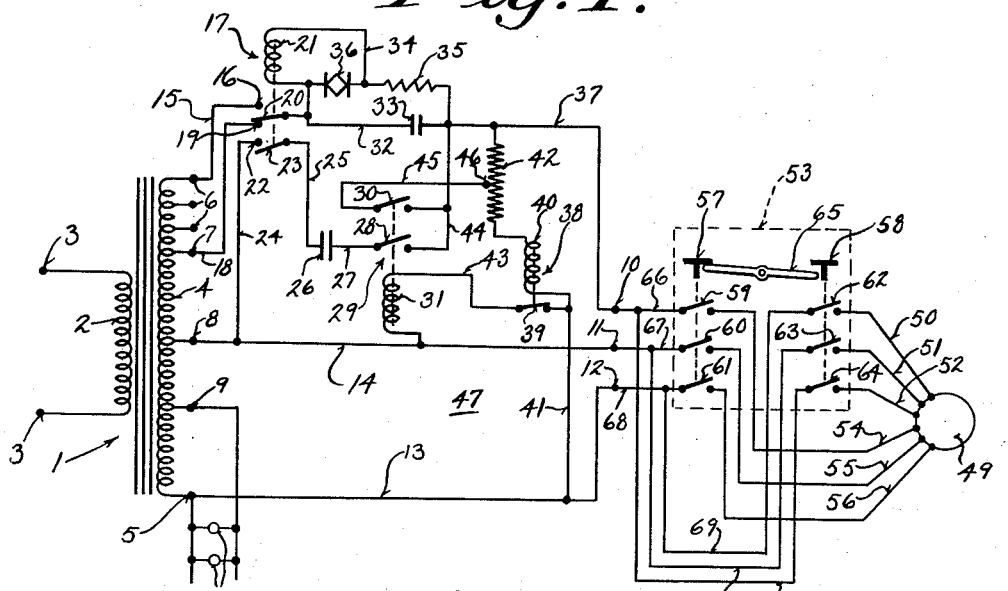

April 29, 1958     R. E. KOLL ET AL     2,832,925
PHASE CONVERTER
Filed March 16, 1955

INVENTORS
Robert E. Koll
Leroy B. Ronk
BY
Arthur H. Seidel
ATTORNEYS

United States Patent Office 2,832,925
Patented Apr. 29, 1958

2,832,925

PHASE CONVERTER

Robert E. Koll and Leroy B. Ronk, Nokomis, Ill., assignors to System Analyzer Corporation, Nokomis, Ill., a corporation of Wisconsin Application March 16, 1955, Serial No. 494,764

9 Claims. (Cl. 318—221)

This invention relates to static phase converters and more specifically resides in a converter having a circuit network including a phase shifting impedance to produce a three phase output and a starting circuit for a motor to be joined to the converter that includes a starting capacitor and switching means for inserting and removing the starting capacitor from the active circuit network, the switching means having elements responsive to voltage conditions at the load for control of the capacitor and further having relay means responsive to the voltage across the phase shifting impedance for further controlling insertion and removal of the starting capacitor from the active circuit.

Heretofore, static phase converters for the conversion of single phase power to three phase power have usually been employed at the immediate location of the three phase load. The converter has been electrically joined intermediary a disconnect switch and the load. Thus, if a three phase induction motor is to be operated from a single phase source through a phase converter, the converter has customarily been disposed on the load side of the start-stop control switch joining the motor with the power source. The necessity of placing the converter in this position causes inconvenience. At the situs of the load, or motor, space often is at a premium and a relocation of the converter at a point remote from both the load and the control switch would alleviate the space consideration as well as permit the converter to be installed in a location under the care of the power distributor, rather than the power consumer. Maintenance may then become an orderly function of the power distributor, who is better equipped and more versed in the maintenance of electrical apparatus.

The necessity for placing existing converters between the line switch and load has been due to the need for disconnecting the converter to avoid injurious circulating currents. To enhance the use of a phase converter the present invention contemplates a circuit network wherein the need for an interruption between the line and converter is eliminated. Thus the start-stop control switch may be employed on the load side of the converter, rather than the power line side. The converter may then be disposed in a location remote from the load to be operated and may, if desired, be conveniently housed as part of the power line equipment. Custody and care of the apparatus will then reside in the power distributor.

It is an object of this invention to provide a static phase converter that may be employed on the power line side of the control switches for the apparatus to be operated.

It is another object of this invention to provide a static phase converter with a starting control circuit network that is readied for the initial starting operation of a motor connected through the converter, whenever a prolonged interruption of the circuit between the converter and motor occurs, rather than by an interruption of the circuit between the line and the converter as in existing devices.

It is another object of this invention to provide a static phase converter that may be employed for the operation of a multi-speed motor.

It is another object of this invention to provide a static phase converter for the operation of a three phase motor that need not be disconnected from the power lines upon opening the circuit between the converter and the motor.

It is another object of this invention to provide a phase converter through which a single phase load, such as a lighting load, may be operated continuously regardless of the connection to a three phase load also being fed through the converter.

It is another object of this invention to provide a phase converter that presents a reduced open circuit voltage across certain of the output terminals, upon the interruption of the connections with a three phase load being fed thereby.

It is another object of this invention to provide a phase converter in which the three phase output circuits are inductively coupled with the single phase input circuit.

It is another object of this invention to provide a static phase converter with control switch means for a motor starting circuit network that is responsive to the voltage appearing across phase shifting elements in the converter, and which is protected from any abnormal increase in the voltage appearing across such elements.

These and other objects and advantages of this invention will appear in the description to follow. In the description reference is made to the accompanying drawing, which forms a part hereof, and in which there is shown by way of illustration and not of limitation particular embodiments in which the invention may be employed.

Figure 2:
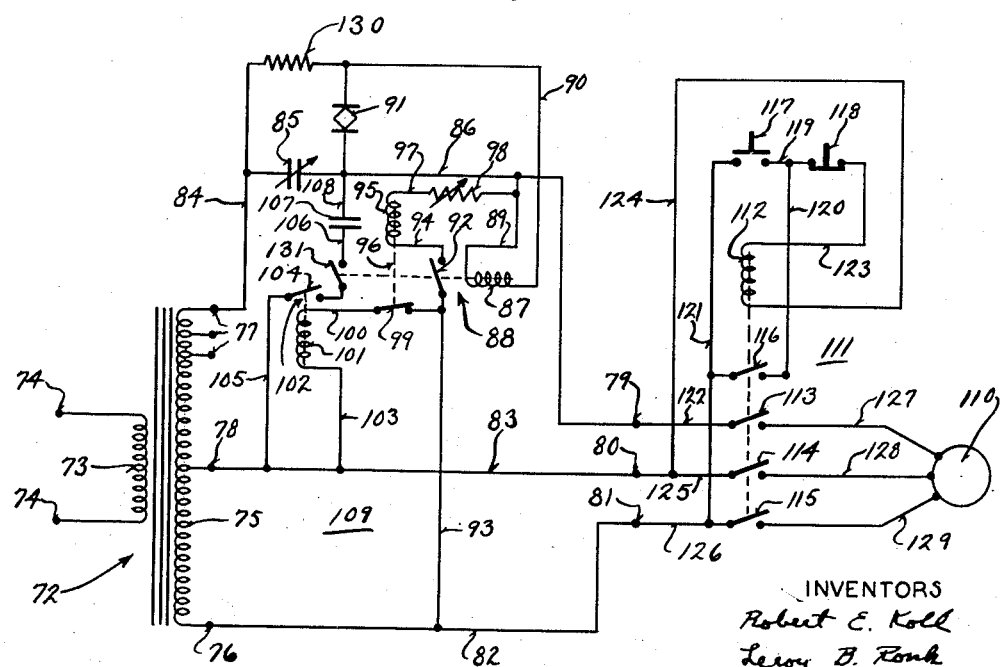

In the drawing:

Fig. 1 is a wiring diagram of a static phase converter embodying this invention to which there is connected a multi-speed induction motor together with an associated speed change switch, and Fig. 2 is a wiring diagram of another form of static phase converter in which the invention is embodied to which there is connected a three phase induction motor together with an associated electro-magnetic control switch.

Referring now to the drawing, there is shown in Fig. 1 a transformer 1 having a primary winding 2 with a pair of input taps 3, and a separate secondary winding 4 inductively coupled with the winding 2. The secondary winding 4 has an output tap 5 at one end, a set of output taps 6 at the opposite end, a low voltage tap 7 adjacent the taps 6, and taps 8 and 9 disposed between the taps 5 and 7.

A set of three output terminals 10, 11 and 12 are provided for connection with a three phase load. A lead 13 extends between the output tap 5 of the transformer secondary winding 4 and the output terminals 12. Another lead 14 connects between the tap 8 and the output terminal 11. One of the variable voltage taps 6 leading from the secondary winding 4 is connected through a lead 15 to a normally open contact 16 of a voltage control relay 17. The low voltage tap 7 is, in turn, connected through a lead 18 with a normally closed contact 19 of the voltage control relay 17. The voltage control relay 17 has a movable contact arm 20 that is normally in engagement with the contact 19 and which may be moved into engagement with the contact 16 upon energization of a winding 21, that forms a part of the relay 17. To complete the relay 17, there is provided a normally open contact 22 and a movable contact arm 23 that is operated to and from engagement with the contact 22 upon energization and deenergization of the coil 21. A lead 24 connects the normally open contact 22 to the lead 14 and the movable contact arm 23 is joined through a lead 25 to one side of a starting capacitor 26. The opposite side of the starting capacitor 26 is joined through a lead 27 to one side of a set of normally open contacts 28 of an electro-magnetic switch 29, which switch 29 also includes a second set of normally open contacts 30 and an operating winding 31.

The movable contact arm 20 of the voltage control relay 17 is connected through a lead 32 to one side of a phase shifting capacitive impedance 33 and also to one side of the winding 21. The opposite side of the winding 21 is connected through a lead 34 to the junction between a current limiting resistor 35 and a protective device 36, that is connected in parallel to the winding 21. The protective device 36 exhibits a decrease in impedance with an increase in applied voltage that exceeds a predetermined threshold value, and may be formed of a powdered carborundum composition, such as is known for the particular purpose. The resistor 35 is connected at the end opposite that connected with the lead 34 to a lead 37, which in turn joins one side of the phase shifting impedance 33 with the output terminal 10.

A control relay 38 has a set of normally closed contacts 39 and a winding 40 connected at one end through a lead 41 to the lead 13 and at the opposite end through a resistor 42 to the lead 37. In this fashion the winding 40 and the resistor 42 are disposed in series relation across the leads 13 and 37, to cause the control relay 38 to be responsive to the voltage appearing across the output terminals 10 and 12. The winding 31 of the switch 29 is joined at one end through a lead 43 and the normally closed relay contacts 39 to the lead 41, and at the opposite end with the lead 14. The side of the normally open contacts 28 of the switch 29, opposite that side joined to the starting capacitor 26, is joined through a lead 44 to the lead 37. Likewise, one side of the normally open contacts 30 are joined through the lead 44 to the lead 37. The opposite side of the normally open contacts 30 are joined through a lead 45 to an adjustable tap 46 on the resistor 42.

The circuit elements and connections that have been described comprise a phase converter network that is designated generally by the numeral 47. The circuit network 47 extends between the input terminals 3 and the output terminals 10, 11 and 12, and provides converting a single phase input into a three phase output for the operation of a three phase motor, to be connected to the terminals 10, 11 and 12 as will be hereinafter explained. The network 47 also includes the tap 9 of the transformer secondary winding for providing, in conjunction with the tap 5, a power source for a single phase load, such as is represented by lamps 48. Such single phase load may be operated continuously off the secondary of the transformer 1.

A multi-speed motor 49 is connected to a first set of motor input leads 50, 51 and 52 that are adapted to be connected to the output terminals 12, 11 and 10 respectively through a two-speed switch 53 for high speed operation. A second set of input leads 54, 55 and 56 for the motor 49 may also be connected through the multi-speed switch 53 to the output terminals 10, 11 and 12 respectively, for low speed operation. The multi-speed switch 53 has a low speed manually engageable push button 57 and a high speed manually engageable push button 58. The low speed button 57 may be depressed to close a set of contactors 59, 60 and 61 that are connected to the leads 54, 55 and 56 respectively, and the high speed button 58 may be depressed to close a set of contactors 62, 63 and 64 that are connected to the leads 50, 51 and 52 respectively. A mechanical interlock 65 prohibits simultaneous depression of the buttons 57 and 58, thus ensuring that the motor 49 is operated alternatively at high or low speeds.

The contactors 59, 60 and 61 are connected through leads 66, 67 and 68 respectively to the output terminals 10, 11 and 12 respectively, and the contactors 62, 63 and 64 are connected through leads 69, 70 and 71 and leads 66, 67 and 68 respectively to the terminals 10, 11 and 12.

Thus, by depressing either button 57 or 58 connections are completed between the motor 49 and the output terminals 10, 11 and 12.

With the transformer input terminals 3 connected to a source of single phase power a voltage appears across the secondary winding 4 to provide a working voltage for the lamps 48 and to present a potential at the terminals 10, 11 and 12. With the contactors of the two-speed switch 53 all open the voltage between terminals 11 and 12 is equal to that required for one of the three phases for balanced conditions of the load. The voltage appearing across terminals 10 and 12 will be considerably greater, since these terminals are connected across a greater number of turns of the transformer secondary winding 4. To retain this voltage within prescribed safe limits the relay contact arm 20 is closed with the relay contact 19 for joining the low voltage tap 7 with the terminal 10.

The voltage across terminals 10 and 12 is insufficient to excite the winding 40 of the control relay 38 for pickup of the normally closed relay contacts 39. The winding 31 of the switch 29 is thus placed across the leads 13 and 14, and energized by the voltage appearing across the transformer taps 5 and 8 to close the contacts 28 and 30. Closure of the switch contact 28 connects one side of the starting capacitor 26 to the lead 37. The other side of the capacitor 26, joined to normally open contact arm 23 of the voltage control relay 17, is not connected and thus there will be no destructive circulating currents through the capacitors 26 and 33 when the circuit between the converter network 47 and the motor 49 is interrupted. Closure of the switch contact 30 connects the adjustable tap 46 of the resistance 42 to the lead 37, thus reducing the value of resistance in the circuit for the relay winding 40. The relay winding 40, however, is not sufficiently excited to open the contacts 39 when the output terminal 10 is joined to the low voltage tap 7.

To start the motor 49 the low speed button 57 is depressed, to connect the motor leads 54, 55 and 56 to the output terminals 10, 11 and 12. A current inrush will ensue in the leads 13, 14 and 37, as is usual during the initial start of a motor. The inrush current in the lead 37 passes through the capacitive impedance 33 and the closed relay contacts 19, 20, with a resulting voltage drop appearing across the impedance 33 to energize the voltage control relay winding 21 and pick up the relay contact arms 20 and 23. The contact arm 20 moves into engagement with the contact 16 to impose the full voltage upon the terminal 10 that is required for motor operation. The contact arm 23 simultaneously closes with the contact 22 to insert the starting capacitor 26 in the active circuit network.

As is common with induction motors, the motor 49 will have a lower power factor during starting than at normal speed under rated load. To accommodate for this low power factor, and for the current inrushes encountered during starting, the capacitor 26 is automatically inserted in the active circuit network in shunt relation to the capacitive impedance 33 and the portion of the transformer secondary winding between the taps 6 and 8. A value for the capacitor 26 is selected so that for initial start the phase voltages and currents will be in substantial balance. As motor speed now increases balance will be lost and the voltage across terminals 10 and 12 will rise well above a rated phase voltage for the motor 49.

Upon occurrence of an imbalance of phase voltages whereby the voltage across terminals 10, 12 rises substantially above balanced voltage condition the control relay winding 40 will pick up and open the contacts 39, thereby deenergizing the winding 31 of the switch 29. Contacts 28 and 30 now open, removing the starting capacitor 26 from the active circuit network and placing the entire resistance 42 in series with the control relay winding 40.

The impedance 33 now presents the entire capacitance employed in the active circuit network, for causing a requisite phase shift during operation of the motor 49 at rated speed and load. By proper predetermined selection of value for both the capacitive impedance 33 and the voltage between taps 6 and 8 of the transformer secondary 4, balanced phase voltages and currents will be attained for the particular load imposed by the motor 49, in known fashion. Thus, the voltage across the control relay coil 40 and the resistance 42 will decrease after the switching operation of both the control relay 38 and the switch 29. The phase voltage, however, is greater than the drop-out voltage of winding 40, and the contacts 39 will remain open during normal running of the motor 49.

Since the voltage appearing across the capacitive impedance 33 may rise to large values under certain unusual operating conditions the protective device 36 is employed to safeguard the voltage control relay winding 21. The impedance of the device 36 will remain at a substantially constant high level throughout the normal range of working voltages for the winding 21, however, the impedance rapidly diminishes if the impressed voltage rises above certain safe levels for the winding 21. The current then readily passes through the device 36 to thereby prohibit destructive current flow in the winding 21.

To operate the motor 49 at its higher rated speed the button 58 is depressed, to close contactors 62, 63, 64. The interlock 65 will raise the button 57 to open the contactors 59, 60 and 61. The immediate current surge, that follows depression of the button 58, causes a drop in voltage across the terminals 10, 11 and 12. The drop-out voltage of the control relay winding 40, with the full resistance 42 in the circuit, is substantially less than balanced phase voltage during running of the motor at constant rated speed under load, but is also greater than the value to which the voltage at the terminals 10, 11 and 12 now falls. Thus, the relay contacts 39 will now be closed due to drop-out of the control relay 38, and switch winding 31 will be energized for closure of switch contacts 28 and 30. The starting capacitor 26 is thereby inserted in the active circuit network during acceleration of motor 49 to the higher of its two rated speeds, for purposes like that during initial start of the motor 49.

As motor speed rises imbalance of phase voltages, again characterized by a rise across terminals 10 and 12 in substantial excess of the balanced phase voltage, causes the control relay winding 38 to pick up and open the contacts 39. The starting capacitor 26 is removed from the active circuit and balanced conditions will be achieved for normal running of the motor 49.

Upon opening the contactors 62, 63 and 64, thus disconnecting the motor 49 and removing the load from the phase converter network 47, load current passing through the capacitive impedance 33 is interrupted. The contact arms 20, 23 of voltage control relay 17 drop out and low voltage tap 7 of the transformer secondary 4 is connected through the impedance 33 to the output terminal 10. The voltage across the control relay 38 then decreases and contact 39 recloses to energize the relay winding 31. The apparatus is now ready for a subsequent operation of the motor 49.

Referring now to Fig. 2 of the drawing, there is shown a transformer 72 having a primary winding 73 with a pair of input taps 74. A secondary winding 75 of the transformer 72 has an output tap 76 at one end, a set of variable output taps 77 at the opposite end and a tap 78 disposed between taps 76 and 77.

A set of three output terminals 79, 80 and 81 are provided for connection with a three phase load. A lead 82 is joined between the terminal 81 and the tap 76 of the transformer 72. Similarly, a lead 83 is joined between the output terminal 80 and the tap 78 of the transformer 72. Connected to one of the taps 77 of the transformer 72 is a lead 84 that is joined at its opposite end to one side of a phase shifting capacitive impedance 85. The opposite side of the capacitive impedance 85 is joined through a lead 86 with the output terminal 79.

A coil 87 of a control relay 88 has one side attached to the lead 86 through a lead 89, and the opposite side of the coil 87 is connected through a lead 90 and a resistor 130 with one side of the capacitive impedance 85. Thus, the coil 87 of the control relay 88 is connected in parallel relation with the capacitive impedance 85, so that the relay 88 is responsive to the voltage drop appearing across the capacitive impedance 85. A protective device 91, similar to the device 36 in Fig. 1, is joined between the leads 86 and 90 for a parallel connection with the coil 87 of the relay 88. The purpose of the device 91 is to afford a protection to the coil 87 when unusually high voltages appear across the capacitive impedance 85.

A set of normally open contacts 92 are provided for the control relay 88 which are moved to closed position upon a sufficient excitation of the coil 87. One side of the contacts 92 is connected through a lead 93 to the lead 82. The opposite side of the contacts 92 is connected through a lead 94 with one side of a winding 95 of a relay 96. The opposite side of the winding 95 is joined through a lead 97 and a resistor 98 to the lead 89. Normally closed contacts 99 of the relay 96 are connected at one side to the lead 93 and on the opposite side through a lead 100 to a coil 101 of a switch 102. The other side of the coil 101 is connected through a lead 103 to the lead 83. A set of normally open contacts 104 for the switch 102 have one side connected through a lead 105 to the lead 83 and the opposite side of the contacts 104 is joined through a set of normally open contact 131 of the relay 88 and a lead 106 with a starting capacitor 107. The capacitor 107 is connected at its opposite side through a lead 108 with the lead 86.

The circuit network that has been described in connection with Fig. 2 and which constitutes the circuit elements between the input taps 74 and the output terminals 79, 80 and 81, constitutes a phase converter circuit network that is designated generally by the reference numeral 109.

A three phase squirrel cage induction motor 110 is shown in Fig. 2, as a representative load for connection to the output terminals 79, 80 and 81 through a motor control switch 111. The motor control switch 111 has an operating coil 112, a set of three line contactors 113, 114 and 115, and an auxiliary contact 116. To control the energization and deenergization of the control switch winding 112 there is provided a normally open start push button 117 and a normally closed stop push button 118. A lead 119 connects one side of the start push button 117 with one side of the stop push button 118. A lead 120 extends from the lead 119 through the auxiliary contacts 116 and a portion of a lead 121 to an output lead 126, that is joined between the output terminal 81 of the phase converter 109 and the contactor 115 of the motor control switch 111. The lead 121 also connects the side of the start push button 117, opposite that joined to the lead 119, with the lead 126. The side of the stop push button 118, opposite that joined to the lead 119, is connected through a lead 123 to one side of the coil 112, and hence through a lead 124 with an output lead 125 that is joined between the output terminal 80 and the contactor 114. A third output lead 122 joins the output terminal 79 with the contactor 113. A set of leads 127, 128 and 129 connect the input terminals of the motor 110 with the contactors 113, 114, 115 respectively.

With the input terminals 74 connected to a suitable power source, and before starting the motor 110 the coil 95 of the relay 96 will be deenergized since the contacts 92 of the control relay 88 are in their normal open position. The normally closed contacts 99 of the relay 96 thus connect the coil 101 of the switch 102 across the leads 82 and 83. The coil 101 is thereby energized to close the contact 104, as a preliminary step in completing the circuit for the starting capacitor 107. Contacts 131 of the control relay 88 are still open, however, to prevent circulating currents through the capacitor 107 and the capacitive impedance 85.

To start the motor 110 the push button 117 is depressed to close its contacts. An energizing circuit for the coil 112 of the motor control switch 111 is then completed which comprises the lead 121 joined to the output lead 126, the closed push button 117, the normally closed stop push button 118, the lead 123, the switch coil 112 and the lead 124 joined to the output lead 125. Upon energization of the coil 112 the contactors 113, 114 and 115 will be closed as well as the auxiliary contacts 116.

Upon closure of the auxiliary contacts 116 being accomplished, the start push button 117 may be released and the switch coil 112 will remain energized, since a closure of the auxiliary contacts 116 completes a self holding energizing circuit for the coil 112 in which the closed auxiliary contacts 116 shunt the normally open push button 117.

Upon starting, current drawn for the motor 110 will cause a substantial voltage drop to appear across the capacitive impedance 85, and the coil 87 of the control relay 88 will then be energized. Upon energization of the coil 87 the normally open contacts 131 are closed to place the starting capacitor 107 in the active circuit to supplement the capacitive impedance 85, similarly as the capacitor 26 in Fig. 1 supplemented the capacitive impedance 33. Also, the value of the starting capacitor 107 is selected to provide a substantial balance of currents and voltages in the three phase output of the converter 109 at the initial start of the motor 110, in a fashion similar to that of the starting capacitor 26 in Fig. 1.

Energization of the coil 87 also closes the normally open contacts 92 to complete the energizing circuit for the coil 95 of the relay 96, which circuit extends through the lead 93 joined to the lead 82, the contacts 92, the lead 94, the coil 95, the lead 97, the limiting resistor 98, and the lead 89 joined to the lead 86. The coil 95 is now readied to open the contacts 99 upon occurrence of a sufficient excitation. As the speed of the motor 110 increases the initial current and voltage balance provided by the starting capacitor 107 will no longer be sustained, and the phase voltages will become imbalanced to produce a large voltage drop across the energizing circuit for the winding 95 that is in excess of balanced load conditions. The increased excitation then causes the winding 95 to pick up and open the contacts 99. Upon an opening of the contacts 99 the coil 101 of the switch 102 will be deenergized, so that the contacts 104 will open and remove the starting capacitor 107 from the active circuit network. For accomplishing removal of the starting capacitor 104 from the circuit, the relay 96 thus performs a similar function as the control relay 38 in Fig. 1.

By proper predetermined adjustment of the capacitive impedance 85 and the taps 77 of the transformer 72 balanced phase voltages and phase currents may be attained for the particular load of the motor 110, and the converter network 109 will function in like manner as the converter network 47 during normal running of the motor 110.

If it is desired to stop the motor 38 the push button 118 may be depressed to open its contacts. Opening of the contacts of the push button 118 interrupts the energizing circuit for the coil 112 and causes opening of the contactors 113, 114 and 115, as well as the auxiliary contact 116. Interruption of the motor circuit will cause the voltage appearing across the capacitive impedance 85 to fall to such value that the excitation of the control relay coil 87 is insufficient to retain the contacts 92 and 131 closed. Upon an opening of the contacts 92 the energizing circuit for the coil 95 of the relay 96 is interrupted to assure deenergization of the coil 95. The contacts 99 will then assume normally closed position and place the switch coil 101 across the leads 82 and 83. Opening of the contacts 131 prohibits destructive circulating currents, and the circuit network is ready for a subsequent starting of the motor 110.

There is thus provided an automatic resetting of the starting circuit wherein the starting capacitor 107 is ready to be placed in the circuit for attaining an initial balance of phase voltages and currents for the next cycle of operation. The control relay 88, being responsive to the voltage appearing across the capacitive impedance 85, will bring the capacitor 107 into the active circuit upon starting and it is not necessary to open the connection between the single phase power source and the primary winding 73 of the transformer 72, in order to avoid circulating currents.

The apparatus of Fig. 2 may be employed with a multi-speed motor, similarly as the apparatus of Fig. 1. The relay 96 will exhibit drop-out characteristics like that of the control relay 38 to switch the starting capacitor 107 into the active circuit for acceleration from the lower to the higher speed. Also, each form of the invention shown in the drawing may be used in connection with a reversible motor.

In each form of the invention a control relay, 38 in Fig. 1 and 96 in Fig. 2, is responsive to a phase voltage at the load for switching a starting capacitor from the circuit, so as to arrange the circuit for balanced phase voltages and currents during steady running of the load. To ensure that such control relay is deenergized with its contacts closed at the start of the motor load a relay responsive to the voltage of the phase shifting impedance is employed. In the apparatus of Fig. 1, such relay is the voltage control relay 17 which causes the voltage across the control relay 38 to be of decreased value when the voltage across the impedance 33 is small. In the apparatus of Fig. 2, such relay is the relay 88 which opens the circuit of the control relay 96 when the voltage across the impedance 85 is small. The phase voltage responsive relays 38 and 96 also function to place the starting capacitors 26, 107 in the active circuit upon increasing the speed of a multi-speed motor or when reversing a motor through a usual reversing switch.

Apparatus embodying the invention comprises a self-contained unit that may conveniently be disposed on the power line side of the disconnect or starting switches for the load. As such apparatus of the invention may be placed at a distance from the load, and is adapted for line pole equipment under the custody and care of a power distributor.

We claim:

1. In a phase converter the combination comprising a transformer having a set of output taps, a set of three output terminals for connection to a load, a phase shifting impedance, circuit connections joining one of said transformer output taps through said impedance to one of said output terminals and each of the other output terminals to a transformer output tap, a starting capacitor, switch means having an operating winding connected between a pair of said output terminals and contacts operatively responsive to said winding, circuit connections for said starting capacitor including said switch means contacts adapted to connect said capacitor between a transformer output tap and the output terminal to which said impedance is joined, control relay means having a winding excited by a voltage appearing across said impedance and contacts operatively responsive to such winding that are cooperatively related with said switch means operating winding to reduce voltage across said switch means operating winding when the excitation of the winding of said control relay means is insufficient to operate said relay contacts.

2. In a phase converter the combination comprising a transformer with an output winding having end taps and a tap therebetween, a set of three output terminals for connection to a load, a phase shifting impedance, circuit connections joining an end tap of said transformer through said impedance to one of said output terminals and each of said other taps to one of said terminals, a starting capacitor, switch means for said capacitor having a winding responsive to voltage between a pair of said output terminals and contacts operable thereby, second circuit connections including said switch means contacts adapted to join said starting capacitor between said output terminal to which said impedance is joined and a point on said transformer output winding, and control relay means responsive to voltage across said impedance having first contacts in circuit with said switch means winding to reduce the voltage thereon upon the voltage across said impedance being insufficient to excite said relay means for operation of the relay contacts and second contacts in series with the starting capacitor to open said second circuit connections when the relay means is not sufficiently excited by the impedance voltage for operation.

3. In a phase converter the combination comprising a voltage source with a winding tapped to have voltages taken therefrom, a set of three output terminals each joined to a tap of said winding, a phase shifting impedance inserted between one of said terminals and said winding, a starting capacitor for insertion between a terminal and said winding, switch means having a coil that is responsive to voltage across a pair of said terminals and contacts adapted for inserting said capacitor between the winding and a terminal, and relay means having a coil excited by voltage across said impedance with normally open contacts cooperatively related with said starting capacitor to interrupt the insertion of said capacitor between the winding and a terminal when the voltage across said impedance is insufficient to operate said relay means contacts.

4. In a phase converter the combination comprising a voltage source with a winding tapped to have voltages taken therefrom; a set of three output terminals; a phase shifting impedance; connections joining one of said terminals through said impedance to a tap of said winding and each of said other terminals to other taps to supply balanced phase voltages and currents to a three phase motor attached to said output terminals; a starting capacitor connectable between said winding and an output terminal; and switch means having a winding disposed across a pair of said terminals and contacts responsive thereto adapted to pick up upon a voltage in substantial excess of a balanced phase voltage occurring between the terminals and to drop out upon a voltage substantially less than balanced phase voltage appearing between the terminals, and contacts in circuit with said starting capacitor adapted to open for removal of said capacitor from connection between said winding and a terminal upon drop out of said switch means and to close for connecting said capacitor between said winding and terminal upon pick up of said switch means.

5. In a phase converter the combination comprising a voltage source with a winding tapped to have voltages taken therefrom; a set of three output terminals; a phase shifting impedance; connections joining one of said terminals through said impedance to a tap of said winding and each of said other terminals to other taps to supply balanced phase voltages and currents to a three phase motor attached to said output terminals; a starting capacitor connectable between said winding and an output terminal; switch means having a winding disposed across a pair of said terminals and contacts responsive thereto adapted to pick up upon a voltage in substantial excess of a balanced phase voltage occurring between the terminals and to drop out upon a voltage substantially less than balanced phase voltage appearing between the termi-
nals, and contacts in circuit with said starting capacitor adapted to open for removal of said capacitor from connection between said winding and a terminal upon drop out of said switch means and to close for connecting said cpacitor between said winding and terminal upon pick up of said switch means; and relay means with a coil responsive to a voltage across said phase shifting impedance and contacts cooperatively related with said switch means winding to limit voltage applied to the switch means winding upon the voltage across said impedance being insufficient to cause said coil to operate the relay contacts.

6. A phase converter in accordance with claim 5 in which the impedance has alternative connections to the voltage source winding that include a low voltage connection and a high voltage connection, and said relay means has two sets of contacts in said alternative connections whereby the low voltage connection is completed when the voltage across said impedance is insufficient to cause said coil to operate its contacts and whereby the high voltage connection is completed upon said coil operates its contacts.

7. A phase converter in accordance with claim 5 in which the relay means contacts are in series with said switch means winding.

8. In a phase converter the combination comprising a transformer with an output winding having end taps and a tap therebetween, a set of three output terminals for connection to a load, a phase shifting impedance, circuit connections joining an end tap of said transformer through said impedance to one of said output terminals and each of said other taps to one of said terminals, a starting capacitor, switch means for said capacitor having a winding responsive to voltage between a pair of said output terminals and contacts operable thereby, second circuit connections including said switch means contacts adapted to join said starting capacitor between said output terminal to which said impedance is joined and a point on the transformer winding, and control relay means responsive to voltage across said phase shifting impedance with contacts in series with said switch means winding to de-energize the switch means winding upon insufficient voltage appearing across said impedance to actuate said switch means.

9. In a phase converter the combination of a transformer having a single phase input and a set of three output connections; a set of three output terminals; a phase shifting capacitive impedance; connections joining said impedance between a transformer output connection and an output terminal, and joining the other output terminals to the remaining transformer output connections; a starting capacitor adapted to be joined for placing capacitance in addition to that of said impedance between the transformer and output terminal to which the impedance is joined; control relay means having a coil joined across a pair of said output terminals and contacts responsive to the coil in circuit with the starting capacitor between the transformer and an output terminal; and relay means having a winding connected across said impedance to be responsive to the voltage appearing across the impedance, first contacts operable by the coil in series with said starting capacitor and said control relay means contacts, and second contacts also operable by the coil in the energizing circuit of said control relay means.

References Cited in the file of this patent

UNITED STATES PATENTS

| 2,049,177 | Rumpel | July 28, 1936 |
| 2,497,522 | Walker | Feb. 14, 1950 |
| 2,677,096 | Holcomb | Apr. 27, 1954 |